United States Patent [19]

Heikkilä

[11] Patent Number: 5,198,742
[45] Date of Patent: Mar. 30, 1993

[54] METHOD OF PREVENTING THE STALLING OF AN ASYNCHRONOUS MACHINE

[75] Inventor: Samuli Heikkilä, Helsinki, Finland

[73] Assignee: ABB Stromberg Drives OY, Helsinki, Finland

[21] Appl. No.: 614,244

[22] Filed: Nov. 16, 1990

[30] Foreign Application Priority Data

Nov. 20, 1989 [FI] Finland ............................. 895523

[51] Int. Cl.$^5$ ............................................. H02P 5/40
[52] U.S. Cl. ................................. 318/803; 318/807
[58] Field of Search ............... 318/800, 802, 803, 805

[56] References Cited

U.S. PATENT DOCUMENTS

| 4,338,559 | 6/1982 | Blaschke | 318/805 |
| 4,503,376 | 3/1985 | Okuyama | 318/802 |
| 4,593,240 | 6/1986 | Blaschke | 378/800 |
| 4,672,287 | 6/1987 | Fujioka et al. | 318/800 |
| 4,677,360 | 6/1987 | Garces | 318/803 |

OTHER PUBLICATIONS

Studies in Electrical and Electronic Engineering; "Transient Phenomena in Electrical Machines"; Kovacs; 1984; pp. 32, 33, 36, 37, 90, 91.

Primary Examiner—William M. Shoop, Jr.
Assistant Examiner—John W. Cabeca
Attorney, Agent, or Firm—Watson, Cole, Grindle & Watson

[57] ABSTRACT

The invention relates to a method of preventing the stalling of an asynchronous machine controlled by a controller (6) affecting the slip and having a response time less than a rotor time constant ($\tau_r$) of the machine. To minimize the safety margin between the allowable maximum torque and the stalling torque, the method comprises the steps of measuring rotational vectors ($\bar{i}_s$, $\bar{u}_s$) for the stator current and stator voltage of the machine; determining, on the basis of the measured rotational vectors ($\bar{i}_s$, $\bar{u}_s$) of the stator current and stator voltage and a short-circuit inductance ($\sigma L_s$) of the machine, two vectors one of which ($\bar{\phi}_s$) is parallel to the direction of the stator flux ($\bar{\psi}_s$) and the other ($\bar{\phi}_r$) to the rotor flux ($\bar{\psi}_r$); determining an angle ($\gamma$) between said vectors parallel to the stator and rotor fluxes or a value ($\mu$) proportional to it; and preventing the controller from performing operations tending to increase the torque of the asynchronous machine when said angle ($\gamma$) or the value ($\mu$) proportional to it corresponds to a predetermined angle between the stator and rotor flux vectors.

16 Claims, 4 Drawing Sheets

ROTOR FLUX COORDINATE SYSTEM

STATOR COORDINATE SYSTEM

METHOD OF PREVENTING THE STALLING OF AN ASYNCHRONOUS MACHINE

This invention relates to a method of preventing the stalling of an asynchronous machine controlled by a controller affecting the slip and having a response time less than the rotor time constant of the machine. The method enables the realization of limiting control to prevent the exceeding of the stalling point of the asynchronous machine when the stator current and stator voltage and the product of the dispersion coefficient of the machine and the stator inductance (i.e., the short-circuit inductance) are known, and when there is available a controller which is able to affect the slip with a sufficiently fast response time.

The electrical torque (T) of an asynchronous machine varies as a function of the mechanical speed ($\omega_m$) typically as shown by the stalling curve of FIG. 1, where $\omega_s$ is the electrical frequency and the pole pair number is 1. Normally, the machine is controlled so that its operating point will be on the descending portion of the curve, where the torque increases with increasing slip frequency $\omega_s - \omega_m$. The greatest absolute value of the torque $T_p$ is achieved at a frequency $\omega_s \pm \omega_m$ (stalling point). In most cases, the operating point is selected so that the torque is limited within the range from $-T_L$ to $T_L$.

As a function of the supply frequency $\omega_s$, $T_L$ varies typically as shown in FIG. 2. The maximum torque within the frequency range from 0 to $\omega_1$ is determined by the stator current, which should not exceed a maximum value determined for steady-state operation. When the supply frequency exceeds the nominal frequency ($\omega_s > \omega_n$), the operation takes place within a field weakening range in which the stator flux and thus also the maximum torque has to be decreased in inverse proportion to the frequency. Above $\omega_1$, the torque has to be limited more drastically, because the torque of the stalling point, which decreases in proportion to the square of $\omega_s$, is thereby a more limiting factor than the stator current. On the other hand, it is normally desirable that the operating point remains within the descending portion of the stalling curve. Above $\omega_1$, the limitation of the torque is usually carried out either directly as a function of $\omega_s$ or by limiting the slip frequency measured by a tachometer in such a way that a sufficient safety margin remains between $T_L$ and $T_p$ (such as $T_L = 0.7 \times T_P$).

The object of the method of the present invention is to eliminate the safety margin between the allowable torque and the stalling torque without the use of a tachometer. This is achieved by means of a method of the invention which is characterized in that it comprises the steps of measuring rotational vectors for the stator current and stator voltage of the machine; determining, on the basis of the measured rotational vectors of the stator current and stator voltage and a short-circuit inductance of the machine, two vectors one of which is parallel to the direction of the stator flux and the other to the rotor flux; determining an angle between said vectors parallel to the stator and rotor fluxes or a value proportional to it; and preventing the controller from performing operations tending to increase the torque of the asynchronous machine when said angle or the value proportional to it corresponds to a predetermined angle between the stator and rotor flux vectors.

When utilizing the method of the invention, no safety margin is needed as the method enables the determination of the operating point of the machine with respect to the stalling point, whereby a control block preventing the exceeding of the stalling point can be added to the control of the machine. In this way the control range of the torque is substantially increased ($\pm T_L \rightarrow \pm T_P$), which improves the dynamics of the operation, among other things. The method of the invention does not require the use of a tachometer and it prevents, considerably more reliably than prior art methods, the drift of the operating point beyond the stalling point, whereby the overload of the machine is also prevented more effectively.

In the following the invention will be described in greater detail with reference to the attached drawings, wherein FIG. 1 shows a stalling curve of an asynchronous machine;

Figure 1:
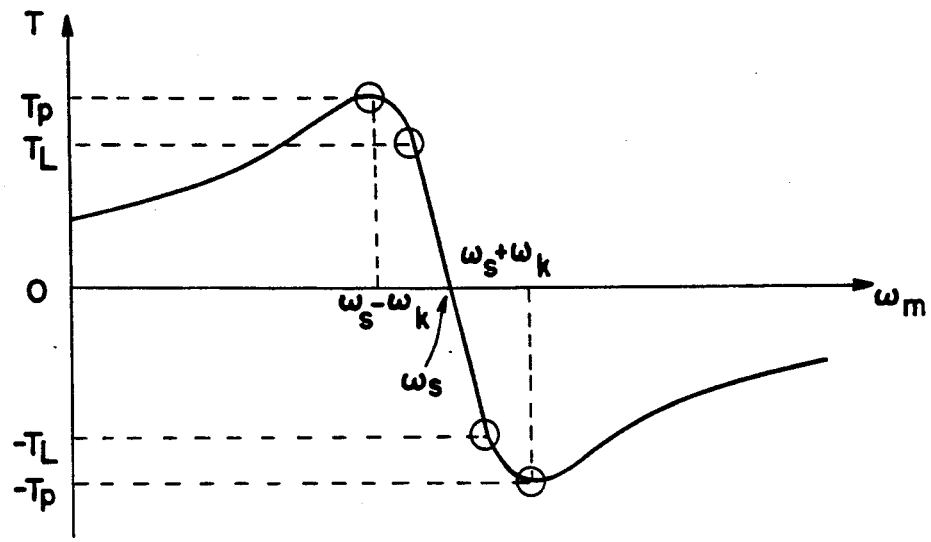
Figure 2:
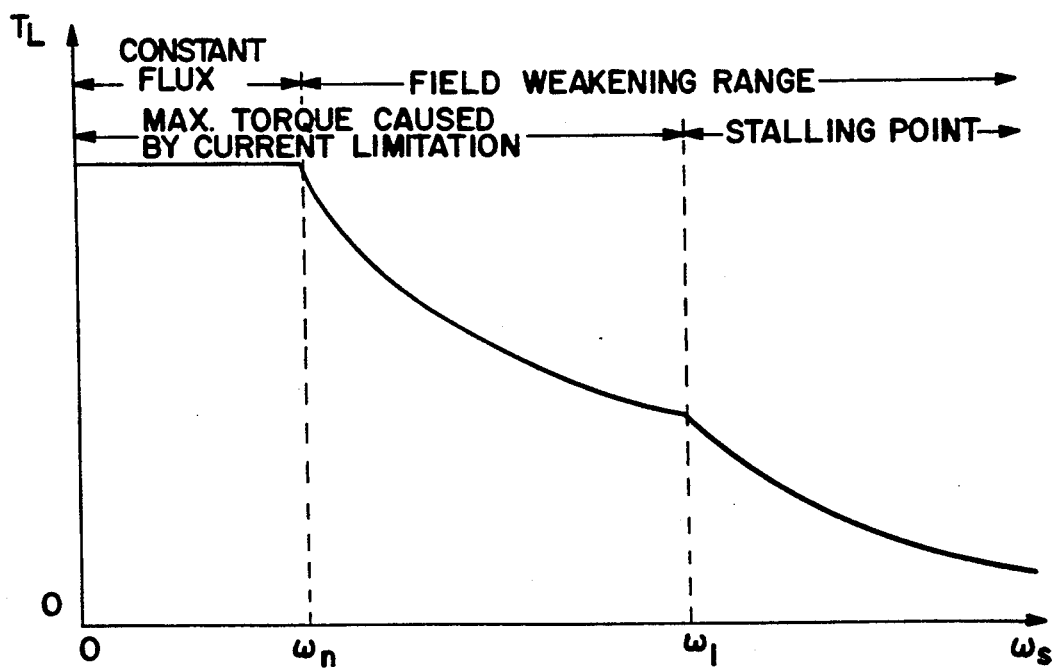
FIG. 2 illustrates the limiting of a torque command as a function of the electrical frequency in one specific case.

To begin with, the differential and current equations of the stator and the rotor of an asynchronous machine will be discussed (Kovacs, P. K., Transient Phenomena in Electrical Machines, Elsevier Science Publishing Co., 1984, p. 32 and 36):

$$\bar{u}_s{}^s = R_s \bar{i}_s{}^s + d\bar{\psi}_s{}^s/dt + j\omega_s \bar{\psi}_s{}^s \quad (1)$$

$$\bar{u}_r{}^r = R_r \bar{i}_r{}^r + d\bar{\psi}_r{}^r/dt + j\omega_r \bar{\psi}_r{}^r \quad (2)$$

$$\bar{i}_s{}^s = (1/\sigma L_s) \cdot (\bar{\psi}_s{}^s - (L_m/L_r) \cdot \bar{\psi}_r{}^s) \quad (3)$$

$$\bar{i}_r{}^r = (1/\sigma L_r) \cdot (\bar{\psi}_r{}^r - (L_m/L_s) \cdot \bar{\psi}_s{}^r) \quad (4)$$

where
$\bar{u}_s$ = stator voltage,
$\bar{u}_r$ = rotor voltage,
$\bar{i}_s$ = stator current,
$\bar{i}_r$ = rotor current,
$R_s$ = stator resistance,
$R_r$ = rotor resistance,
$\psi_s$ = stator flux,
$\psi_r$ = rotor flux,
$\omega_s$ = electrical frequency,
$\omega_r$ = slip frequency,
$L_s$ = stator inductance,
$L_r$ = rotor inductance,
$L_m$ = mutual inductance,
$\sigma = 1 - L_m{}^2/(L_s L_r)$ = dispersion coefficient, and the superscripts s and r indicate that the vector in question is represented in the coordinate system of the stator or the rotor, respectively. It should further be noted that in Eq. 1 and 2 the derivatives of the fluxes are divided into two components of which the components $d\bar{\psi}_s{}^s/dt$ and $d\bar{\psi}_r{}^r/dt$ are parallel to these fluxes and the components $j\omega_s\bar{\psi}_s{}^s$ and $j\omega_r\bar{\psi}_r{}^r$ are perpendicular to them.

By inserting Eq. 4 in Eq. 2 the following dependence will occur between the stator and rotor fluxes when the rotor time constant $\tau_r = L_r/R_r$:

$$\sigma\tau_r(d\bar{\psi}_r{}^r/dt) + j\sigma\tau_r\omega_r\bar{\psi}_r{}^r + \bar{\psi}_r{}^r = (L_m/L_s)\cdot\bar{\psi}_s{}^r \quad (5)$$

Figure 3:
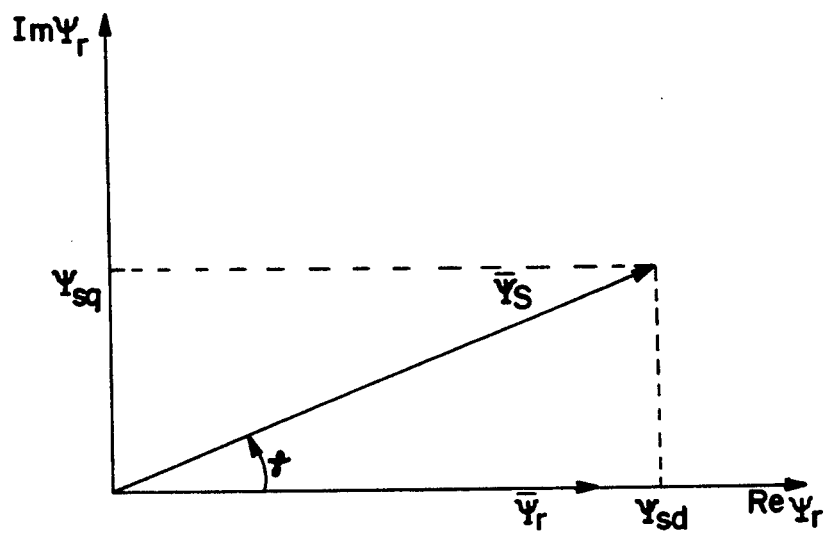
FIG. 3 illustrates the division of the stator flux into components in the coordinate system of the rotor flux.

The stator flux is then divided into a component parallel to the rotor flux and into a component perpendicular to it, as shown in FIG. 3. When Eq. 5 is represented in the coordinate system of the rotor flux, the following dependence will occur between said components and the rotor flux:

$$\sigma\tau_r(d\psi_r/dt) + \psi_r = (L_m/L_s)\psi_{sd} \quad (6)$$

$$\sigma\tau_r\omega_r\psi_r = (L_m/L_s)\psi_{sq}, \quad (7)$$

where $\psi_{sd}$ = the stator flux component parallel to the rotor flux; and $\psi_{sq}$ = the stator flux component perpendicular to the rotor flux.

In the steady state $$\psi_r = (L_m/L_s)\psi_{sd} \quad (8)$$

$$\sigma\tau_r\omega_r\psi_r = (L_m/L_s)\psi_{sq} \quad (9)$$

From FIG. 3 and Eq. 3 and 8, the following formula is obtained for the proportionality value of the electrical torque (Kovacs, P. K., Transient Phenomena in Electrical Machines, Elsevier Science Publishing Co., 1984, p. 91) when the angle between the stator and rotor fluxes is:

$$\begin{aligned}T &= Im\{\bar{\psi}_s{}^*\bar{i}_s\} = Im\{\psi_s{}^*\cdot(1/\sigma L_s)\cdot(\bar{\psi}_s - (L_m/L_r)\bar{\psi}_r)\} \\ &= (1-\sigma)/(\sigma L_m)\cdot Im\{\bar{\psi}_s\bar{\psi}_r{}^*\} \\ &= (1-\sigma)/(\sigma L_m)\cdot \psi_s\cdot\psi_r\sin(\gamma) \\ &= (1-\sigma)/(\sigma L_m)\cdot \psi_s\cdot(L_m/L_s)\psi_{sd}\cdot\sin(\gamma) \\ &= (1-\sigma)/(\sigma L_s)\cdot\psi_s\cdot\psi_s\cos(\gamma)\cdot\sin(\gamma) \\ &= (1-\sigma)/(2\sigma L_s)\cdot\psi_s{}^2\sin(2\gamma)\end{aligned} \quad (10)$$

It appears from the equation that in the steady state the maximum torque (=the stalling torque) will results when $\gamma = \pi/4$, i.e. $\tan(\gamma) = 1$. Correspondingly, $\tan(\gamma) = 1$ when the machine works as a generator and the stalling point is negative.

The stalling point may thus be indicated on the basis of a tangent calculated from the angle between the stator flux and the rotor flux. It will be disclosed below how the tangent can be calculated solely on the basis of the actual electrical values and parameters of the machine. The vectors occurring in the equations are represented in the coordinate system of the stator.

Assume that the rotational vectors $\bar{i}_s$ and $\bar{u}_s$ of the stator current and stator voltage as well as the machine parameters $\sigma$, $L_s$, $L_r$ and $R_s$ are known. The stator flux can then be solved from the differential equation of the stator (Eq. 1) and then the rotor flux from Eq. 3:

$$\bar{\psi}_s = \int(\bar{u}_s - R_s\bar{i}_s)dt \quad (11)$$

$$\bar{\psi}_r = (L_r/L_m)\cdot(\bar{\psi}_s - \sigma L_s\bar{i}_s) \quad (12)$$

In Eq. 11, $R_s$ can be assumed to be equal to zero, as the stator resistance is insignificant at high frequencies.

In addition, the ratio $L_r/L_m$ can be indicated to be equal to one when calculating the value $\psi_r$ as it is only the phase angle of $\psi_r$ that is significant in this connection, so the approximations of the fluxes will be:

$$\bar{\phi}_s = \int \bar{u}_s dt \quad (13)$$

$$\bar{\phi}_r = \bar{\phi}_s - \sigma L_s\bar{i}_s, \quad (14)$$

where $\bar{\phi}_s$ = the estimate of the stator flux, and $\bar{\phi}_r$ = the estimate of the rotor flux.

The real and imaginary parts of the flux estimates calculated by means of Eq. 13 and 14 are designated with the symbols $\phi_{sx}$, $\phi_{sy}$, $\phi_{rx}$ and $\phi_{ry}$ whereby $$\bar{\phi}_s = \phi_{sx} + j\phi_{sy} \quad (15)$$

$$\bar{\phi}_r = \phi_{rx} + j\phi_{ry} \quad (16)$$

Figure 4:
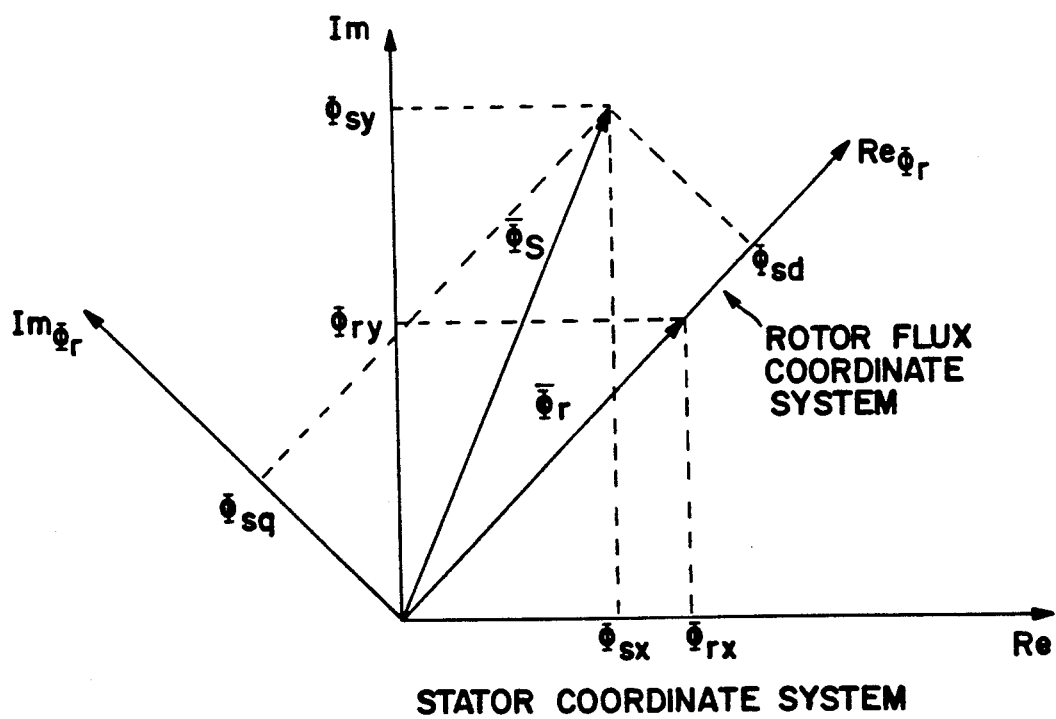
FIG. 4 illustrates the division of an estimated stator flux into components in the coordinate systems of the stator and the rotor flux.

The coordinates of the stator flux estimate in the coordinate system defined by the rotor flux estimate (FIG. 4) will thereby be:

$$\phi_{sd} = (\phi_{sx}\phi_{rx} + \phi_{sy}\phi_{ry})/\phi_r \quad (17)$$

$$\phi_{sq} = (\phi_{sy}\phi_{rx} - \phi_{sx}\phi_{ry})/\phi_r \quad (18)$$

On the basis of these equations, the approximation of $\tan(\gamma)$ (designated with the symbol $\mu$) will get the formula $$\tan(\gamma) = \psi_{sq}/\psi_{sd} \approx \phi_{sq}/\phi_{sd} = \mu = (\phi_{sy}\phi_{rx} - \phi_{sx}\phi_{ry})/(\phi_{sx}\phi_{rx} + \phi_{sy}\phi_{ry}) \quad (19)$$

Figure 5:
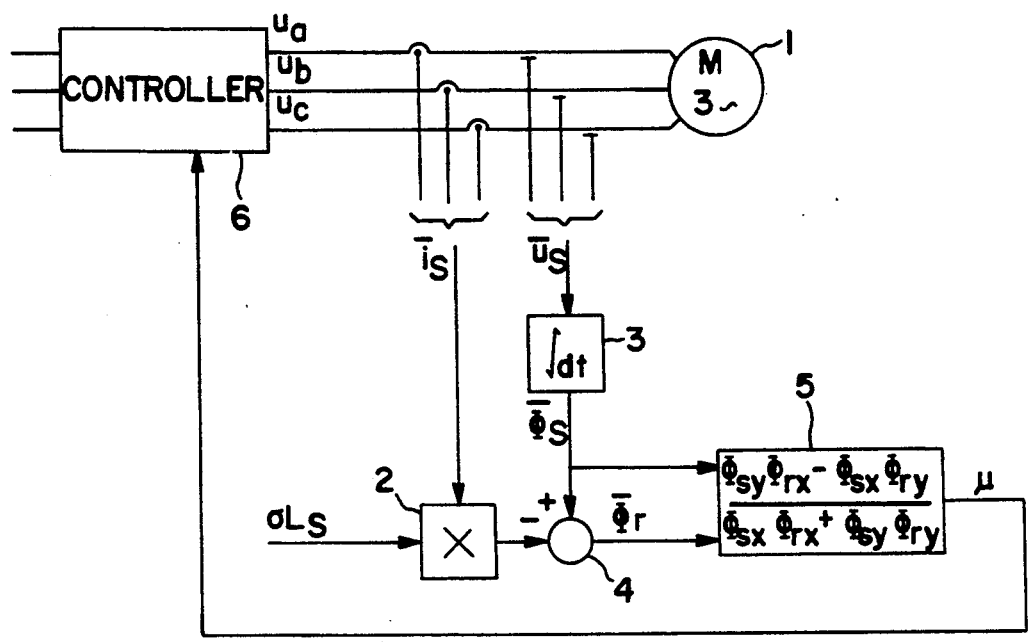
FIG. 5 illustrates the method of the invention as a flow chart.

The flow chart of FIG. 5 illustrates the calculation of $\mu$ by Eq. 13 to 19. In the flow chart, the measured rotational vectors $\bar{i}_s$ and $\bar{u}_s$ of the stator current and stator voltage of the machine 1 are applied to blocks 2 and 3, respectively. The block 2 is a multiplier in which the rotational vector $\bar{i}_s$ of the stator current is multiplied with the short-circuit inductance $\sigma L_s$ of the machine. The block 3 is an integrator in which the rotational vector of the voltage is integrated to obtain the estimate $\bar{\phi}_s$ of the stator flux. When the output of the block 2 is subtracted from this stator flux estimate in a block 4, the output of the summer 4 will be the rotor flux estimate $\bar{\phi}_r$ in accordance with Eq. 14. A block 5, the input of which are formed by the stator and rotor flux estimates, calculates the value of $\mu$ by utilizing Eq. 15 to 19, and this value is then applied to a controller 6 controlling the machine. Other connections and measurements associated with the controller are not shown since they are obvious to one skilled in the art and do not fall within the scope of the present invention. Furthermore, the structure of the controller depends to some extent on its operating principle, that is, for instance, whether a torque, frequency or voltage control is applied.

Figure 6:
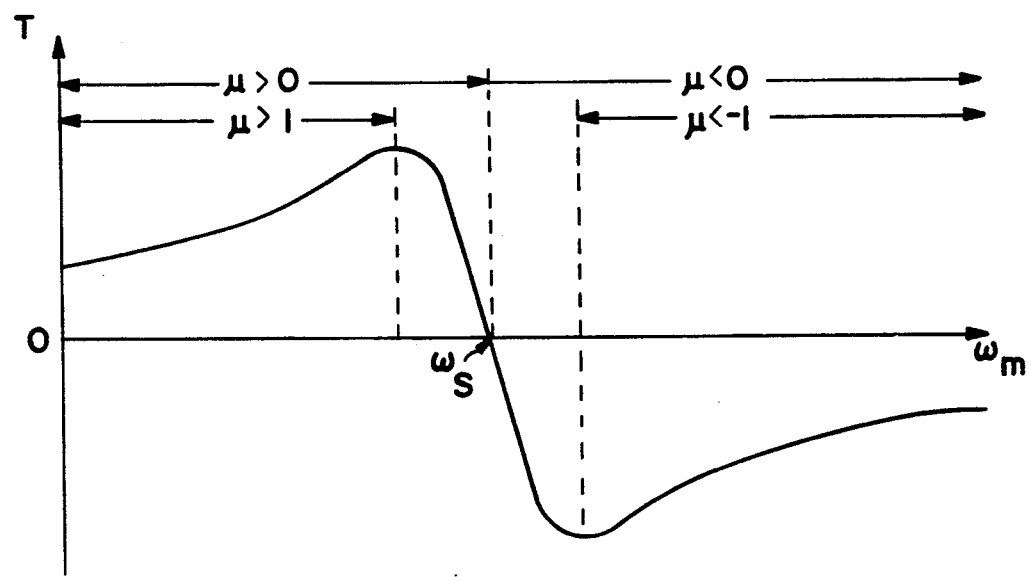
FIG. 6 illustrates the dependence of a control parameter calculated according to the invention on the operating point of the machine on a stalling curve.

The dependence of $\mu$ on the operating point on the stalling curve is shown in FIG. 6. It is to be seen that the sign of $\mu$ is the same as that of the torque. In fact, $\mu$ is directly proportional to the slip frequency as one gets by dividing the sides of Eq. 9 by the respective sides of Eq. 8:

$$\sigma\tau_r\omega_r = \tan(\gamma) \approx \mu \quad (20)$$

However, $\mu$ contains information on the position of the operating point of the machine with respect to the stalling point so that $\mu$ is equal to 1 at the positive stalling point and equal to $-1$ at the negative stalling point. This can be utilized in the limiting control, which prevents the exceeding of the stalling point.

Figure 7:
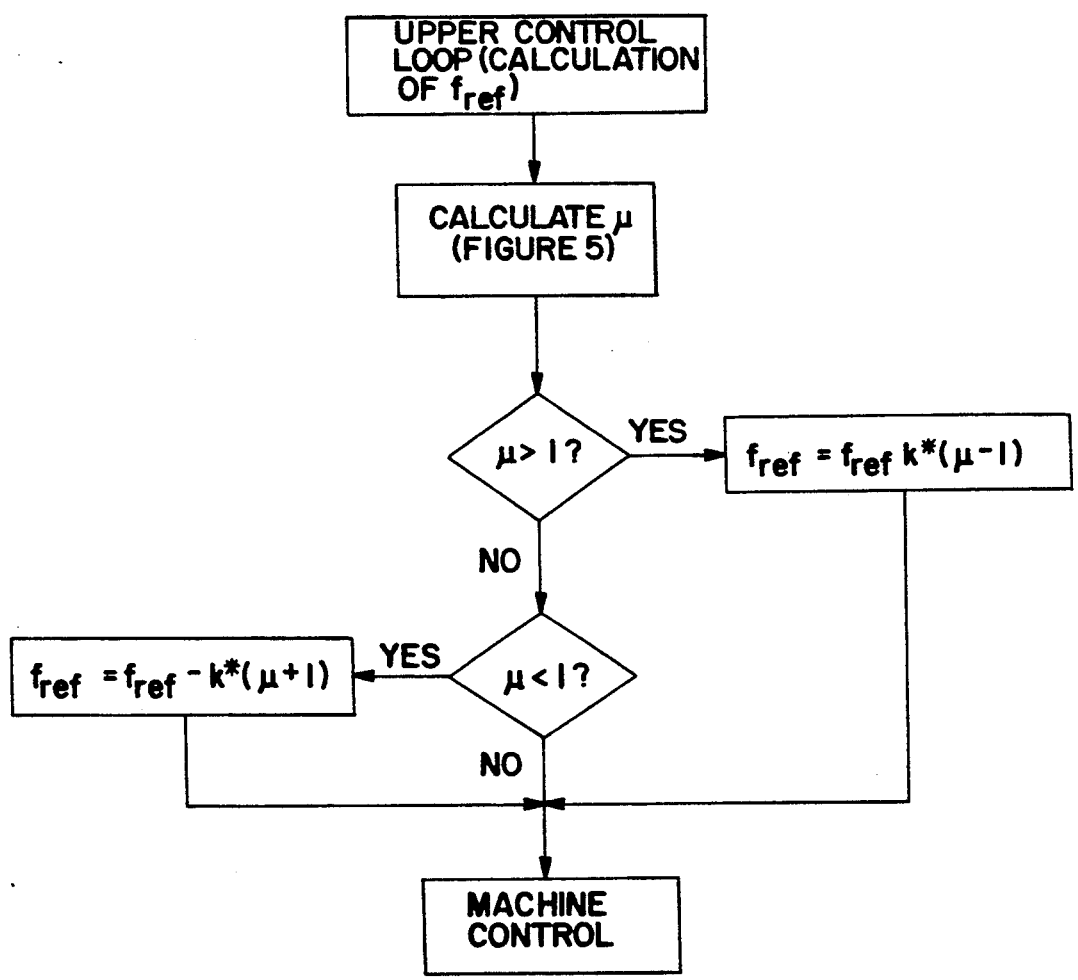
FIG. 7 shows an example of the utilization of the invention in a limiting control preventing the exceeding of the stalling point of a frequency-controlled asynchronous machine.

FIG. 7 shows a flow chart of an example of the inner control loop of a frequency-controlled machine control, which loop utilizes a limiting control based on the method of the invention. This limiting control tends to decrease a frequency command ($f_{ref}$) obtained from the outer control loop if the operating point goes beyond the positive stalling point. Correspondingly, it tends to increase the frequency command if the operating point goes beyond the negative stalling point. If $|\mu| \leq 1$, the limiting control does not change the given frequency command. k is a parameter depending on the type of the machine. It affects the sensitivity of the limiting control.

The invention can be applied in all machine controls in which the slip frequency can be affected with a response time less than the rotor time constant. A change in the slip can be achieved, for instance, by controlling frequency (FIG. 7) or torque or by affecting the mechanical speed by varying the load torque.

I claim:

1. A method of preventing the stalling of an asynchronous machine controlled by a controller affecting the slip and having a response time less than the rotor time constant ($\tau_r$) of the machine, comprising the steps of:
   measuring rotational vectors ($\bar{i}_s$, $\bar{u}_s$) for the stator current and stator voltage, respectively, of the machine;
   determining, on the basis of the measured rotational vectors ($\bar{i}_s$, $\bar{u}_s$) of the respective stator current and stator voltage and a short-circuit inductance ($\sigma L_s$) of the machine, two vectors, one of which ($\bar{\phi}_s$) is parallel to the direction of the stator flux ($\bar{\psi}_s$) and the other is parallel to the direction of the rotor flux ($\bar{\psi}_r$);
   determining an angle ($\gamma$) between said two vectors parallel to the stator and rotor fluxes; and
   preventing the controller from performing operations tending to increase the torque of the asynchronous machine when said angle ($\gamma$) corresponds to a predetermined angle between the stator and rotor flux vectors.

2. A method according to claim 1, wherein the vector ($\bar{\phi}_s$) parallel to the stator flux is determined by integrating the rotational vector ($u_s$) of the stator voltage with respect to time to obtain the stator flux vector ($\bar{\psi}_s$), the vector ($\bar{\phi}_r$) parallel to the rotor flux being determined by subtracting the product of the short-circuit inductance and the rotational vectors of the stator current from the stator flux vector.

3. A method according to claim 1, wherein the value (u) proportional to the angle between the vectors parallel to the stator and rotor fluxed is determined by determining the coordinates of the vector parallel to the stator flux in the coordinate system of the rotor flux and by determining the quotient of these coordinates.

4. A method according to claim 1, wherein said predetermined angle ($\gamma$) between the stator and rotor flux vectors is about 45 degrees.

5. Apparatus for preventing the stalling of an asynchronous machine controlled by a controller affecting the slip and having a response time less than the rotor time constant ($\tau_r$) of the machine, comprising:
   means for measuring rotational vectors ($\bar{i}_s$, $\bar{u}_s$) for the respective stator current and stator voltage of the machine;
   means for determining, on the basis of the measured rotational vectors ($\bar{i}_s$, $\bar{u}_s$) of the respective stator current and stator voltage and a short-circuit inductance ($\sigma L_s$) of the machine, two vectors, one of which ($\bar{\phi}_s$) is parallel to the direction of the stator flux ($\bar{\psi}_s$) and the other is parallel to the rotor flux ($\bar{\psi}_r$);
   second means for determining an angle ($\gamma$) between said vectors parallel to the stator and rotor fluxes; and
   means for preventing the controller from performing operations tending to increase the torque of the asynchronous machine when said angle ($\gamma$) corresponds to a predetermined angle between the stator and rotor flux vectors.

6. Apparatus according to claim 5, wherein the vector ($\bar{\phi}_s$) parallel to the stator flux is determined by said means for determining by integrating the rotational vector ($u_s$) of the stator voltage with respect to time to obtain the stator flux vector ($\bar{\phi}_s$), the vector ($\bar{\phi}_r$) parallel to the rotor flux being determined by subtracting the product of the short-circuit inductance and the rotational vectors of the stator current from the stator flux vector.

7. Apparatus according to claim 5, wherein the value (u) proportional to the angle between the vectors parallel to the stator and rotor fluxes is determined by third means for determining the coordinates of the vector parallel to the stator flux in the coordinate system of the rotor flux and by determining the quotient of these coordinates.

8. Apparatus according to claim 5, wherein said predetermined angle ($\gamma$) between the stator and rotor flux vectors is about 45 degrees.

9. A method of preventing the stalling of an asynchronous machine controlled by a controller affecting the slip and having a response time less than the rotor time constant ($\tau_r$) of the machine, comprising the steps of:
   measuring rotational vectors ($\bar{i}_s$, $\bar{u}_s$) for the stator current and stator voltage, respectively, of the machine;
   determining, on the basis of the measured rotational vectors ($\bar{i}_s$, $\bar{u}_s$) of the respective stator current and stator voltage and a short-circuit inductance ($\sigma L_s$) of the machine, two vectors, one of which ($\bar{\phi}_s$) is parallel to the direction of the stator flux ($\bar{\psi}_s$) and the other is parallel to the direction of the rotor flux ($\bar{\psi}_r$);
   determining an angle ($\gamma$) between a value (u) proportional to the stator and rotor fluxes; and
   preventing the controller from performing operations tending to increase the torque of the asynchronous machine when said value (u) proportional to said angle ($\gamma$) corresponds to a predetermined angle between the stator and rotor flux vectors.

10. A method according to claim 9, wherein the vector ($\bar{\phi}_s$) parallel to the stator flux is determined by integrating the rotational vector ($u_s$) of the stator voltage with respect to time to obtain the stator flux vector ($\bar{\psi}_s$), the vector ($\bar{\phi}_r$) parallel to the rotor flux being determined by subtracting the product of the short-circuit inductance and the rotational vectors of the stator current from the stator flux vector.

11. A method according to claim 9, wherein the value (u) proportional to the angle between the vectors parallel to the stator and rotor fluxes is determined by determining the coordinates of the vector parallel to the stator flux in the coordinate system of the rotor flux and by determining the quotient of these coordinates.

12. A method according to claim 9, wherein said predetermined angle ($\gamma$) between the stator and rotor flux vectors is about 45 degrees.

13. Apparatus for preventing the stalling of an asynchronous machine controlled by a controller affecting the slip and having a response time less than the rotor time constant ($\tau_r$) of the machine, comprising:

means for measuring rotational vectors ($\bar{i}_s$, $\bar{u}_s$) for the respective stator current and stator voltage of the machine;

means for determining, on the basis of the measured rotational vectors ($\bar{i}_s$, $\bar{u}_s$) of the respective stator current and stator voltage and a short-circuit inductance ($\sigma L_s$) of the machine, two vectors, one of which ($\bar{\phi}_s$) is parallel to the direction of the stator flux ($\bar{\psi}_s$) and the other vector is parallel to the direction of the rotor flux ($\bar{\psi}_r$);

second means for determining an angle ($\gamma$) between said two vectors parallel to a value (u) proportional to the stator and rotor fluxes; and means for preventing the controller from performing operations tending to increase the torque of the asynchronous machine when said value (u) proportional to said angle ($\gamma$) corresponds to a predetermined angle between the stator and rotor flux vectors.

14. Apparatus according to claim 13, wherein the vector ($\bar{\phi}_s$) parallel to the stator flux is determined by said means for determining by integrating the rotational vector ($u_s$) of the stator voltage with respect to time to obtain the stator flux vector ($\bar{\phi}_s$), the vector ($\bar{\psi}_r$) parallel to the rotor flux being determined by subtracting the product of the short-circuit inductance and the rotational vectors of the stator current from the stator flux vector.

15. Apparatus according to claim 13, wherein the value (u) proportional to the angle between the two vectors parallel to the stator and rotor fluxes is determined by third means for determining the coordinates of the vector parallel to the stator flux in the coordinate system of the rotor flux and by determining the quotient of these coordinates.

16. Apparatus according to claim 13, wherein said predetermined angle ($\gamma$) between the stator and rotor flux vectors is about 45 degrees.

* * * * *